United States Patent [19]

Meri

[11] 3,816,669

[45] June 11, 1974

[54] APPARATUS FOR DETECTING TELEPHONE RINGING SIGNALS

[75] Inventor: Kalju Meri, Maspeth, N.Y.

[73] Assignee: Electrospace Corporation, Bronx, N.Y.

[22] Filed: Nov. 1, 1972

[21] Appl. No.: 302,868

[52] U.S. Cl. .............................................. 179/84 R
[51] Int. Cl. .............................................. H04m 1/64
[58] Field of Search ....................... 179/84 VF, 84 R

[56] References Cited

UNITED STATES PATENTS

| | | | |
|---|---|---|---|
| 2,299,279 | 10/1942 | Pullis | 179/84 VF |
| 2,299,822 | 10/1942 | Horton, Jr. et al. | 179/84 VF |
| 2,319,306 | 5/1943 | Dickieson | 179/84 VF |
| 2,364,685 | 12/1944 | Baker | 179/84 VF |
| 2,596,977 | 5/1952 | Brandt et al. | 179/84 VF |
| 2,749,390 | 6/1956 | Lewinter | 179/84 VF |
| 2,794,860 | 6/1957 | Scholten et al. | 179/84 VF |
| 3,683,122 | 8/1972 | Kalju | 179/84 R |

*Primary Examiner*—Kathleen H. Claffy
*Assistant Examiner*—Mitchell Saffian
*Attorney, Agent, or Firm*—Friedman & Goodman

[57] ABSTRACT

A ringing signal detector connectable to telephone lines and to an answering machine control circuit has a tuned transformer filter which has a center frequency and a bandwidth selected to pass 20 Hertz ringing signals on the telephone lines to the control circuit while substantially preventing the passage of lower frequency 10 Hertz revert dialing signals. The transformer has a floating primary having two input terminals each of which is connected to a series connected resistor-capacitor combination. A neon lamp extends between the two terminals from points intermediate the resistors and capacitors.

20 Claims, 8 Drawing Figures

APPARATUS FOR DETECTING TELEPHONE RINGING SIGNALS

BACKGROUND OF THE INVENTION

The present invention relates to telephone answering circuits and more particularly to a telephone ringing signal detection means adaptable to telephone answering circuits.

Telephone answering circuits adaptable to telephone lines must be designed to meet technical specifications dictated by telephone companies which own the lines to which the circuits are adapted. Although various refinements have been made in such machines so as to offer a sophisticated range of flexibility in use, the typical approach in the art still utilizes the incoming ringing signal as the initiator of the sequence of answering and/or playback operations. In the past, circuits have been developed which meet the requirements at great cost and with a high degree of unnecessary technical sophistication which generally appreciates maintenance costs, and gives little thought to reliability, rugged construction and overall simplicity. Telehpone companies demand that high impedance circuits be employed to avoid loading telephone ringing and voice circuits. Heretofore, the art has employed a very high impedance relay across the incoming line to detect an incoming ringing signal and thereupon introduce a low impedance load across the line which load would thereupon hold the incoming calls just as lifting the telephone receiver would.

A greater definition of the requirements, and explanation thereof, will be made hereinbelow in connection with the detailed description of one embodiment of the present invention. It should be pointed out at this point, however, that high impedance bridging relay detectors are in all cases poor solutions to meet the stringent requirements. Additionally, such solutions are extremely expensive. The prior art circuits which attempt to meet the requirements are typically unresponsive to low level ringing signals and when made sufficiently sensitive thereto are rendered responsive to signals to which they should not respond. It is particularly desirable that the ringing signal detection circuits be unresponsive to revert dialing signals impressed on telephone company lines when local subscribers, having answering service circuits associated with their hand set, dial the central office for connection to a remote subscriber, so that the detector is not falsely triggered.

Further, the above described prior art relay detectors are inherently not highly sensitive to all incoming ringing signals. The sensitivity attainable with commercially available relays is acceptable under favorable telephone conditions, but are often inadequate under adverse line conditions, and yet are extremely expensive. Maintenance of high sensitivity relays is a considerable problem, since they tend to be somewhat fragile. A definite problem here is the tendency of such relays to trigger falsely in response to transients, for example when the line is being pulsed by dialing of the local instrument. It is particularly desirable that the ringing signal detection circuits be unresponsive to revert dialing signals impressed on telephone company lines when local subscribers, having answering service circuits associated with their hand set, dial the central office for connection to a remote subscriber. Despite these disadvantages, and despite the importance of the problem, the art has heretofore failed to find a more acceptable ringing signal detector circuit judged by the aforesaid requirements which is economically practical.

To summarize, the requirements often made on telephone ringing signal detectors includes the requirement that the detector circuit does not load or unbalance telephone lines. Another requirement is that it rejects revert dialing signals to thereby immunize or prevent triggering of the answering machine as a result of the apperance of revert dialing signals on the telephone lines. A further requirement is that the ringing detector be sensitive to ringing voltage signals over wide voltage or amplitude ranges since these vary considerably between different parts of the country. Finally, there is the requirement that the ringing detector circuits isolate the answering machine from the telephone lines insofar as DC currents are concerned.

While some of the known ringing signal detector circuits have been able to meet one or several of the above requirements, there is not known to date a detector circuit which simultaneously satisfies all of the above requirements and yet is extremely economical to construct and is extremely simple in its mode of operation.

SUMMARY OF THE INVENTION

Accordingly, it is an object of the present invention to provide a ringing signal detector circuit which is not possessed of the disadvantages possessed by similar known circuits.

It is another object of the present invention to provide a ringing detector circuit for use with telephone lines which is simple in construction and econimcal to manufacture.

It is still another object of the present invention to provide a ringing signal detector of the type described above which provides a high impedance to the telephone lines and which does not load down the ringing or the voice circuits of the telephone lines.

It is yet another object of the present invention to provide a ringing signal detector circuit of the type under discussion which does not unbalance the telephone lines with respect to a reference voltage such as the ground.

It is a further object of the present invention to provide a ringing signal detector which is sensitive to ringing voltages over wide ranges commonly found in different parts of the country.

It is still a further object of the present invention to provide a signal ringing detector which provides requisite isolation to DC currents between the telephon lines and the ringing detector circuit.

It is yet a further object of the present invention to provide a ringing signal detector of the type under consideration which is rugged and constructed at low cost and which will not be falsely triggered by revert dialing pulses irrespective of the wave shape of these dialing pulses.

It is an additional object of the present invention to provide a ringing signal detector which satisfies all the technical requirements or specifications imposed on such ringing circuits by the telephone companies who own the telephone lines.

In order to achieve the above objects, as well as others which will become obvious hereafter, the present invention forms part of a telephone answering machine for use with telephone lines carrying ringing signals having predetermined frequency components and other signals having frequency components other than those of the ringing signals. The answering machine is provided with control circuit means. The present invention is characterized in that the ringing signal detector means comprises input circuit means adapted to be coupled to the telephone lines for receiving the signals on the telephone lines. Output circuit means are provided which are associated with the control circuit means. Filter means is provided having attenuating characteristics to only substantially pass the ringing signals from said input to said output circuit means while substantially attenuating the other signals on the telephone lines.

According to a presently preferred embodiment, said filter means comprises a band-pass filter in the form of a tuned transformer stage. Advantageously, said band-pass filter has a center frequency of 20 Hertz and a 3-db bandwidth of 6 Hertz. According to another important feature of the present invention, said tuned transformer stage comprises a transformer having physically isolated primary and secondary windings and tuning or trimming capacitor means connected across the primary winding of said transformer for tuning the latter. Also, said primary winding is advantageously a floating primary winding.

In accordance with further features of the present invention, resistance and capacitance means are connected in series with each of the terminals of the primary winding of the transformer. The capacitance means isolates the Dc current from the ringing detector circuit while the resistance means generates a high impednace load to the ringing detector circuit to thereby prevent loading of the telephone lines.

According to a still further feature of the present invention, attenuating means in the form of a neon lamp are connected across the two leads or terminals of the primary winding of the transformer and extend between the junction points of the respective resistance and capacitance means.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which.

DETAILED DESCRIPTION OF THE PREFERRED EMBODIMENTS

Figures 1, 2, 3, 4, 5, 6, 7, 8:
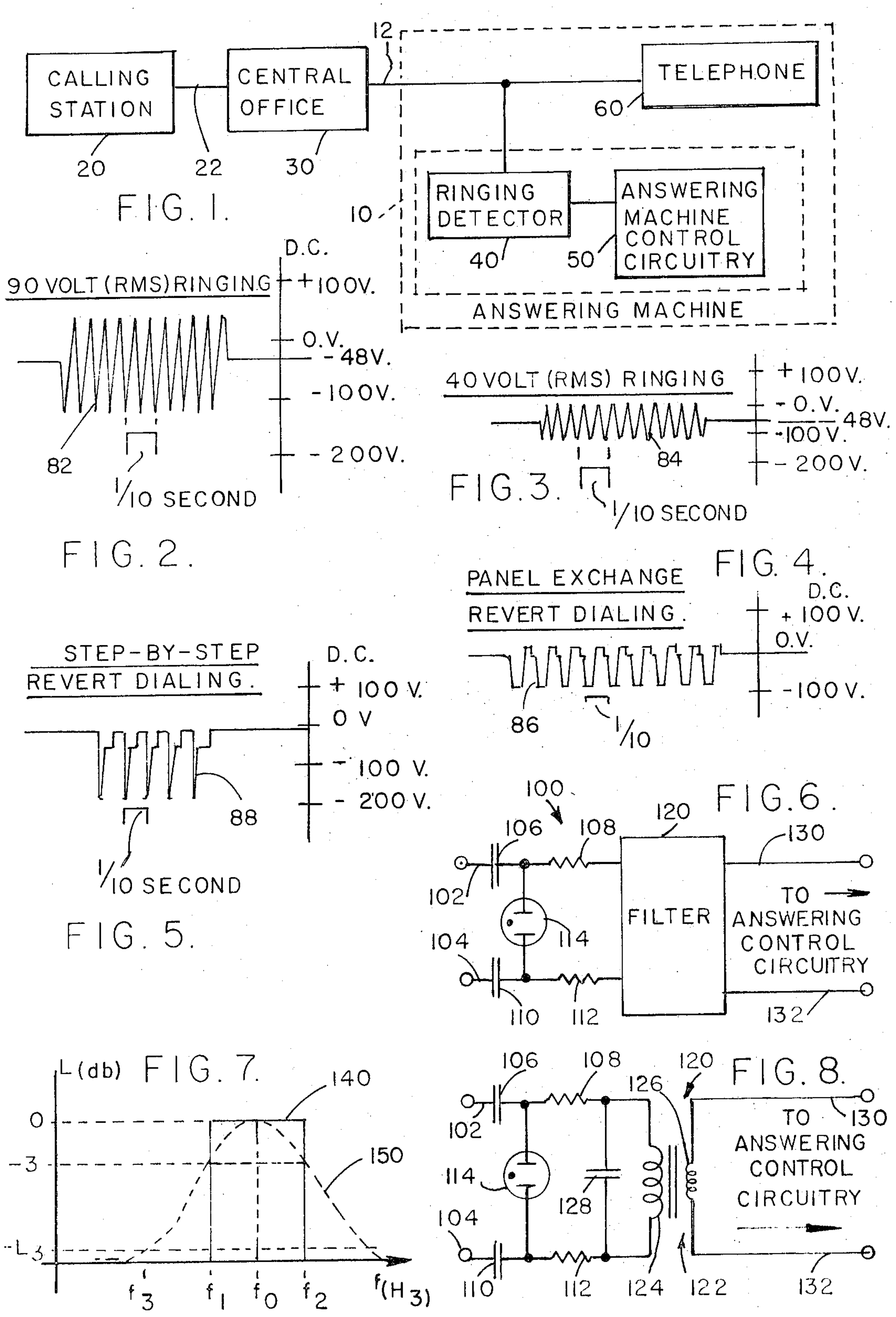
FIG. 1 is a block diagram of a complete telephone system employing the ringing detector and line answering circuit of the present invention.
FIG. 2 is an illustration of an average normal ringing signal.
FIG. 3 is an illustration of a typical low level ringing signal.
FIG. 4 is an illustration of one type of a revert dialing signal associated with a telephone "panel exchange"
FIG. 5 is an illustaration of another type of a revert dialing signal associated with a telephone "step-by-step exchange"
FIG 6 is a schematic of the telphone ringing detector in accordance with the present invention.
FIG. 7 illustrates the pass-band characteristics of ideal and actual filters which may be used in the schematic of FIG. 6.
FIG. 8 is a schematic similar to that of FIG. 6, showing an example of a filter which may be used for the purposes of the present invention.

The problem presented with ringing detectors in telephone answering machines can best be described by the reference to the block diagram of FIG. 1. In order to focus on the problem, the block diagram has been simplified to some extent by omitting the voice portion of the circuit and disclosing only the ringing signal detection and answering machine control means portions of the circuit at the subscriber's station. Although the invention is generally applicable to answering machines but it is not limited to such use alone. The present invention can also be used to activate other apparatus on detection of ringing signals. It is understood that those skilled in the telephone art may readily add speech transmitting and receiving apparatus, and other ringing signal activated apparatus to the circuits illustrated in the drawing, in a manner well known in the art, and that any of many well known types of means may be employed for this purpose.

A subscriber's station, indicated generally at 10, is connected to a calling station 20 via a central office 30 and telephone lines 12 and 22. Such connection on a ringing basis occurs when station 20 "calls" station 10 and office 30 "finds" the line of station 10, as is well known in the art. A voice connection occurs between the stations, when during ringing connection, a proper resistance is imposed across the lines of station 10, a function normally performed by the lifting of the receiver (not shown). The voice connection is effected by the office 30 in response to the current drawn by the interposed resistance, as is also well known in the art.

The present invention is for a novel ringing detector 40 which forms part of a telephone answering machine. The ringing detector 40 is shown connected to answering machine control circuitry 50, the latter controlling various actuating and line answering means (not shown). The input of the ringing detector 40 is connected across the telephone line 12 in parallel with the telephone 60. Thus, all signals which appear on the telephone line 12 simultaneously appear at the telephone as well as at the ringing circuit 40.

The signals which appear on the telephone line 12 will now be discussed. FIG. 2 illustrates an average ringing signal generated by the central office 30 and transmitted to the telephone 60. The ringing signal 82 is shown to be superimposed on a negative level of 48 volts DC. The ringing signal itself approximates a pure sinusoidal signal having a frequency of 20 Hertz. As shown, the amplitude of the average signal is 90 volts RMS. However, due to wide fluctuations in different parts of the country, a ringing signal may have a substantially smaller amplitude. Such smaller amplitude ringing is illustrated in FIG. 3 wherein the ringing signal 84 has a 40 volt RMS amplitude. As before, the ringing signal 84 is superimposed on a −48 volt DC level. In both cases, irrespective of the amplitude of the actual signal, the frequency of ringing signals is maintained at an almost constant 20 Hertz. The ringing bell systems in telephones are frequently selected to only respond to a frequency which is very close to 20 Hertz. Frequencies which deviate substantially from 20 Hertz are rejected by the ringing bell system and the latter does not respond to such off frequencies.

A problem in these answering machines arises from the fact that there are other signals existent between the central office 30 and the telephone 60 which appear, in many respects, very similar to the ringing signals. These additional signals are called revert dialing signals and are generated when the telephone 60 in the subscriber's station 10 makes an outgoing call. Referring to both FIGS. 1 and 4, when the telephone 60 is dialed, the central office 30 generates a revert dialing signal 86 on the telephone line 12. The wave shape of the revert dialing signal is a function of the type of exchange utilized at the central office 30. The revert dialing signal shown in FIG. 4 is generated by what is designated as a "panel exchange" and the revert dialing signal illustrated in FIG. 4 will be referred to as a panel exchange revert dialing signal. It is noted that the latter signal has a peak-to-peak amplitude of approximately 100 volts — a peak amplitude which closely correspond to that of the low ringing signal shown in FIG. 3, and a frequency of 10 Hertz.

In FIG. 5, a revert dialing signal is shown which has a slightly different wave shape as well as a different amplitude as that shown in FIG. 4. The revert dialing signal illustrated in FIG. 5 is associated with what is designated as a "step-by-step" exchange. Here, the revert dialing signal is shown to have high amplitude spikes 88. The peak-to-peak amplitude of the step-by-step revert dialing signal closely corresponds to the peak-to-peak normal ringing signal illustrated in FIG. 2. The spikes 88 can have amplitudes as large as 1,000 volts peak. Again, the frequency of the revert dialing signal is 10 Hertz.

As a result of the close correspondence between the possible ringing signals and the different types of revert dialing signals, it is frequently difficult by an answering machine to distinguish between the signals. Referring to FIG. 1, the ringing detector 40 of the answering machine desirably transmits a signal to the answering machine control circuitry 50 only upon the presence of a ringing signal on the telephone line 12. However, as described above, revert dialing signals are generated when an outgoing call is made on a telephone 60 which may simulate ringing signals and the ringing detector 40 may erroneously trip or start the answering machine. Such false starts of the answering machine are a nuisance and an inconvenience. It is therefore a primary purpose of the present invention to selectively start the answering machine only upon the appearance of a ringing signal on a telephone line 12 while preventing false starts on the appearance of a revert dialing signal. One of the important characteristics which differentiate the ringing signals from the revert dialing signals, irrespective of the amplitudes of either, is the difference in frequencies of the two types of signals. As described above, ringing signals are of almost precise frequencies of 20 Hertz. On the other hand, the revert dialing signals are similarly closely held to 10 Hertz irrespective of the actual wave shapes or of the amplitudes.

The ringing detector in accordance with the present invention is illustrated in FIG. 6 and designated by the reference number 100. The ringing detector has input terminals 102 and 104 each connectable to a telephone line in parallel with a telephone. Connected in series with the terminal 102 is a DC blocking capacitor 106 and a resistor 108. Similarly, a DC blocking capacitor 110 and a resistor 112 are connected in series with the input terminal 104. Connected between the junctions of each of the respective series connected capacitors and resistors is a neon bulb 114. For the purposes of this application and for the claims, the ringing detector circuit thus far described shall be defined as the input circuit. The input circuit is connected to a filter 120. An output circuit comprising output terminals 130 and 132 are connected at the output of the filter 120. The output is connected to the answering control circuitry 50 of FIG. 1.

As described above, it is important for the ringing detector to satisfy stringent technical specifications. Among these include the requirement that it does not load the telephone lines, unbalance them and yet distinguish ringing signals from revert dialing signals under the most extreme conditions. The capacitors 106 and 110 are provided to block the DC biassing voltage which appears on the telephone lines 12. This prevents loading of the telephone lines with respect to DC current. The resistors 108 and 112 are selected to have high resistance values so as to prevent loading of the telephone lines with respect to AC or alternating currents. Thus, the resistors 108 and 112 prevent loading of the telephone lines both with respect to the ringing signals but additionally prevent loading of the voice circuits in both the telephone 60 as well as in the central office 30.

To prevent unbalancing the telephone lines, the series-connected blocking capacitors 106, 110 and the resistors 108, 112 are symmetrically placed in each of the leads of the input circuit.

Although one DC blocking capacitor or one resistor may be utilized, pairs of such components are provided in order to insure that the telephone lines remain balanced. The balance of the telephone lines with respect to a reference potential, e.g. the ground, must be maintained to very exacting requirements. For example, under most circumstances, a balance of 80db is required. The detector 40 in accordance with the present invention maintains such a balance. Slight variances in the values of the capacitors 106, 110 do not upset the balance because of the series relationship of each of these capacitors with a high resistance valued resistor 108, 112.

The size of the capacitors 106, 110 is not critical for the purpose of the present invention. They are normally made of low capacitance only because of cost and size factors. However, the higher the capacitance is, the less reactance appears at the telephone lines 12 to the audio signals. The resistances of the resistors 108, 112 are selected to have high values. Resistors of the order of 100 Kilohms provides satisfactory results. It should also be pointed out that any other DC blocking circuit elements may be utilized instead of the DC blocking capacitors 106, 110. Similarly, any other circuit elements which provides high resistance values may be substituted for the resistors 108, 112.

As described above, revert dialing signals can have spikes of up to 1,000 volts peak. The purpose of the neon bulb 114 is to clip the large amplitude peaks of the step-by-step revert dialing signals in order to reduce the peak-to-peak values of the signals within the range or below the amplitudes of the ringing signals.

An important feature of the present invention is the incorporation of a filter 120 whose function it is to pass the ringing signals from the input circuit to the answering control circuitry while substantially attenuating the revert dialing signals so that the latter do not have sufficient amplitude to actuate the answering machine control circuitry. FIG. 7 illustrates the filter attenuation characteristics. Firstly, an ideal filter 140 is illustrated having a center frequency of $f_.$ and having a lower cut-off frequency $f_1$ and a higher cut-off frequency $f_2$. In the case of the filter 120 of FIG. 6, $f_.$ is selected to be equal to 20 Hertz. Although the precise bandwich of the filter is not critical, it should be so selected so as to reject or substantially attenuate the revert dialing signals. The cut-off frequencies $f_1$ and $f_2$, i.e. the −3db cut-off frequencies, are advantageously selected to be equal to respectively three Hertz below and above the center frequency $f_0$. With the ideal filter attenuating characteristic 140, it is clear that any frequencies below $f_1$ or above $f_2$ are attenuated and are not permitted to pass through the filter. The plot 150 illustrates a practical filter having sloping attenuating legs. A frequency $f_3$, below $f_1$, is attenuated by a filter having characteristics 150, an amount equal to $-L_3$. The frequency $f_3$ of interest here in the present application is 10 Hertz since this is the frequency of the revert dialing signals. For this frequency of $f_3$, the filter characteristic 150 provides a loss of $-L_3$db. The loss at 10 Hertz is advantageously selected to be at least 20 DB. A preferred loss $L_3$ in a region of −30db. With such loss, the 10 Hertz frequency components of the revert dialing signals appear immensely attenuated at the answering machine control circuitry 50 and the latter does not react to these low levels. Accordingly, the answering machine does not commence operation on the appearance of a revert dialing signal on the telephone line 12.

Although the irregularly shaped revert dialing signals (10 Hertz) do have frequency related harmonic components, these have amplitudes sufficiently small so as not to effect the operation of the answering machine. The component of interest with respect to the revert dialing signals is the second harmonic whose frequency is 20 Hertz — the same frequency as that of the ringing signals. Although these second harmonic components of the revert dialing signals can pass through the filter 120, their amplitude is of such a low magnitude that they cannot actuate the answering machine control circuitry 50. For this reason, a filter centered at 20 Hertz which rejects 10 Hertz may be utilized to separate or filter the ringing signals from the revert dialing signals.

It should be made clear, at this point, that although a band-pass filter has been described, a high-pass filter having a cut-off frequency similar to $f_1$ can also be used. In each case, the revert dialing frequency $f_3$ of 10 Hertz will be similarly attenuated while permitting the ringing frequency $f_0$=20 Hertz to pass.

One preferred embodiment of the filter 120 shown in FIG. 6 is shown in FIG. 8. Here, the filter 120 comprises a tuned transformer stage having a primary winding 124 and a secondary winding 126. Connected across the primary winding 124 is a tuning or trimming capacitor 128. The capacitor 128 is so selected so as to form a tuned circuit with the windings whose center frequency is 20 Hertz. To achieve this end, the capacitor 128 may be made a variable capacitor or it may be a trimming capacitor connected in parallel with a fixed capacitor.

It should be noted that the primary winding is floating and is not tapped at any point to ground or to any other reference potential. The illustrated embodiment has the advantage that it insures that no unbalances are created or generated accross the telephone lines due to the connection of a center tap to a point of the primary winding which is not at the precise center point of the winding. Such an inaccurate connection could unbalance the telephone lines.

It is well known that transformer windings have stray or distributed capacitance between the winding turns and the chassy ground. This stray capacitance tends to disturb the balances in a telephone system. One known solution includes the use of a balanced winding transformer or a repeater coil. However, the solution is impractical because of the expensive nature of such components. In the present invention, a very inexpensive transformer may be utilized which may have stray capacitance. However, balance is maintained by the utilization of the resistors 108, 112 and the capacitors 106, 110 arranged in symmetrical fashion in the input circuit to the filter which isolate the telephone lines from the filter transformer. Accordingly, any small unbalance effects which may be generated are buffered by the input circuit. Similarly, the secondary winding 126 is advantageously left floating and is not connected to ground or any other fixed reference potential.

The Answering Devices Sub-Committee of the FCC Dialer and Answering Devices Advisory Committee, together with the telephone companies and the manufacturers of telephone line connected apparatus, is presently seeking to set up minimum standards for telephone answering apparatus. With respect to answering machines, it appears that the impedance of the ringing detector during standby must have a minimum of 7,000 ohms input impedance. With respect to loading of the voice circuits, the answering machines must have a minimum impedance of 50,000 ohms subsequent to answering. These specifications are readily met by the present invention. Thus, by selecting the resistors 108, 112 to be equal to 100,000 ohms, the minimum 7,000 ohms requirement is fully met. An answering machine having a standby impedance of 7,000 ohms may limit the number of extensions which may be connected across a telephone line. Thus, the more extensions which are connected across a telephone line, the lower is the impedance on that telephone line. When several extensions are added to a telephone line, and a low impedance ringing detector is connected across the same telephone line, this may overload the line and a ringing signal appearing on the telephone line will have a diminished peak-to-peak amplitude insufficient to ring any of the bell systems of the telephone extensions. With the present invention, wherein the impedance may be made in the order of magntiude of 100,000 ohms and above, the ringing detector itself does not limit the number of extensions which may be connected across one telephone line — this only being limited by the input impedances of the various telephones connected.

It should thus be noted, that the ringing detector in accordance with the present invention satisfies all the technical requirements while being extremely simple in construction and economical to manufacture. The subject detector 40 separates ringing signals from revert dialing signals and does not cause false actuations of the answering machine by a revert dialing signal on an outgoing call. The ringing detector 40 does not load the ringing and voice circuits of the telephone lines. Typically, a ringing signal having amplitude of 16 volts RMS minimum is required for ringing. Because of the high impedance of the ringing detector, the impedance to the ringing circuit is not effected and therefore the sensitivity of the telephone system to ringing is not diminished even under extreme conditions. Finally, the subject invention isolates the ringing detector circuit from the control circuit with respect to DC currents.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. In a telephone answering machine for use with incoming telephone lines which are connected to a telephone and carry ringing signals having predetermined frequency components as well as signals having frequency components other than those of the ringing signals including dialing signals generated by the telephone during dialing, and wherein the answering machine includes control circuit means; the combination comprising ringing detector means including input circuit means adapted to be coupled to the telephone lines for receiving the signals on the telephone lines; output circuit means connected to the control circuit means; and filter means having attenuating characteristics to pass ringing signals from said input to said output circuit means while substantially attenuating the dialing signals generated by the telephone and applied to the telephone lines, whereby the telephone answering machine is only activated by the ringing signals which pass through said filter means and not activated by the dialing signals which are substantially attenuated before reaching the telephone answering machine by said filter means.

2. The combination defined in claim 1, wherein said filter means comprises a band-pass filter.

3. The combination defined in claim 2, wherein said band-pass filter has a center frequency of 20 Hz.

4. The combination defined in claim 3, wherein said band-pass filter has 3-db bandwidth of 6 Hz.

5. The combination defined in claim 2, wherein said band-pass filter comprises a tuned transformer stage.

6. The combination defined in claim 5, wherein said tuned transformer stage has output terminals constituting said output circuit means; and input terminals connected to said input circuit means.

7. The combination defined in claim 6, wherein said tuned transformer stage comprises a transformer having physically isolated primary and secondary windings; and capacitance means connected across the primary winding of said transformer for tuning the latter.

8. The combination defined in claim 7, wherein said primary winding is a floating primary winding.

9. The combination defined in claim 1, wherein said input circuit means comprises high impedance means for providing a high impedance between the telephone lines and said filter means.

10. The combination defined in claim 9, wherein said input circuit means has two leads connectable to a telephone line, and wherein said high impedance means comprises a series connected resistor in at least one of said leads.

11. The combination defined in claim 10, wherein a series resistor is connected in each lead.

12. The combination defined in claim 11, wherein said resistor has a resistance equal to a value in the range of 100 kilohms.

13. The combination defined in claim 1, wherein said input circuit means comprises DC isolating means for isolating direct currents on the telephone lines from said filter means.

14. The combination defined in claim 13, wherein said input circuit means has two leads connectable to a telephone line, and wherein said isolating means comprises a series connected capacitor in at least one of said leads.

15. The combination defined in claim 14, wherein a series capacitor is connected in each lead.

16. The combination defined in claim 1, wherein the other signals have widely ranging amplitudes, and wherein said input circuit means comprises attenuating means for attenuating the other signals having the larger amplitudes.

17. The combination defined in claim 16, wherein said input circuit means has two leads connectable to a telephone line, and wherein said attenuating means comprises a neon lamp connected across the two leads.

18. The combination defined in claim 1, wherein said input circuit means comprises two leads each connectable to a telephone line and to said filter means, and further comprising direct current decoupling means and high impedance means connected at a connecting point in series in at least one of said leads; and other signal attenuating means connected between said connecting point and the other lead.

19. The combination defined in claim 18, further comprising direct current decoupling means and high impedance means connected at another connecting point in series in the other lead, and wherein said other signal attenuating means is connected between said one and said other connecting points.

20. A telephone ringing signal detector connected to telephone lines which are connected to a telephone and which carry ringing signals having predetermined frequency components as well as signals having frequency components other than those of the ringing signals including dialing signals generated by the telephone during dialing; said ringing signal detector comprising input circuit means adapted to be coupled to the telephone lines for receiving the signals on the latter; output circuit means; and filter means having attenuating characteristics to pass the ringing signals from said input to said output circuit means while substantially attenuating the other signals on the telephone lines.

* * * * *